(12) United States Patent
Overbaugh

(10) Patent No.: US 8,943,542 B2
(45) Date of Patent: Jan. 27, 2015

(54) SYSTEMS AND METHODS FOR PROVIDING PREDEFINED CATEGORY-BASED CHANNEL LISTS

(75) Inventor: Daniel Mark Overbaugh, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1036 days.

(21) Appl. No.: 12/511,884

(22) Filed: Jul. 29, 2009

(65) Prior Publication Data

US 2011/0030010 A1 Feb. 3, 2011

(51) Int. Cl.
| | | |
|---|---|---|
| G06F 3/00 | (2006.01) | |
| G06F 13/00 | (2006.01) | |
| H04N 5/445 | (2011.01) | |
| H04N 7/16 | (2011.01) | |
| H04N 7/20 | (2006.01) | |
| H04N 21/462 | (2011.01) | |
| H04N 21/475 | (2011.01) | |
| H04N 21/482 | (2011.01) | |

(52) U.S. Cl.
CPC ............. *H04N 7/20* (2013.01); *H04N 5/44543* (2013.01); *H04N 21/4622* (2013.01); *H04N 21/4755* (2013.01); *H04N 21/4821* (2013.01)
USPC .................................. 725/56; 725/44; 725/45

(58) Field of Classification Search
CPC ................... H04N 5/445; H04N 21/46–21/48
USPC .......................................................... 725/56
See application file for complete search history.

(56) References Cited

U.S. PATENT DOCUMENTS

| | | | |
|---|---|---|---|
| 7,543,321 B2 * | 6/2009 | Leftwich | 725/44 |
| 7,885,963 B2 * | 2/2011 | Sanders | 707/750 |
| 2006/0107291 A1 * | 5/2006 | Heer | 725/39 |
| 2006/0123449 A1 * | 6/2006 | Ma et al. | 725/58 |
| 2006/0136246 A1 * | 6/2006 | Tu | 705/1 |
| 2007/0124789 A1 * | 5/2007 | Sachson et al. | 725/117 |
| 2007/0157248 A1 * | 7/2007 | Ellis | 725/47 |
| 2009/0235309 A1 * | 9/2009 | Roe | 725/39 |
| 2010/0180292 A1 * | 7/2010 | Epstein et al. | 725/32 |
| 2011/0030010 A1 * | 2/2011 | Overbaugh | 725/45 |

* cited by examiner

*Primary Examiner* — Hunter B Lonsberry
*Assistant Examiner* — Tung T Trinh
(74) *Attorney, Agent, or Firm* — Seed IP Law Group PLLC

(57) ABSTRACT

Various embodiments facilitate generation, distribution, and presentation of category-based predefined channel lists. In one embodiment, an electronic program guide ("EPG") manager is provided for execution on a receiving device, such as a set-top box. The EPG manager receives from a program distributor a predefined channel list that includes multiple channels that carry related programming. The channel list includes an associated category and indicators of the multiple channels, the multiple channels each carrying at least some programming in the associated category. The EPG manager presents to a user at least some of the multiple channels in an electronic program guide. This abstract is provided to comply with rules requiring an abstract, and it is submitted with the intention that it will not be used to interpret or limit the scope or meaning of the claims.

13 Claims, 9 Drawing Sheets

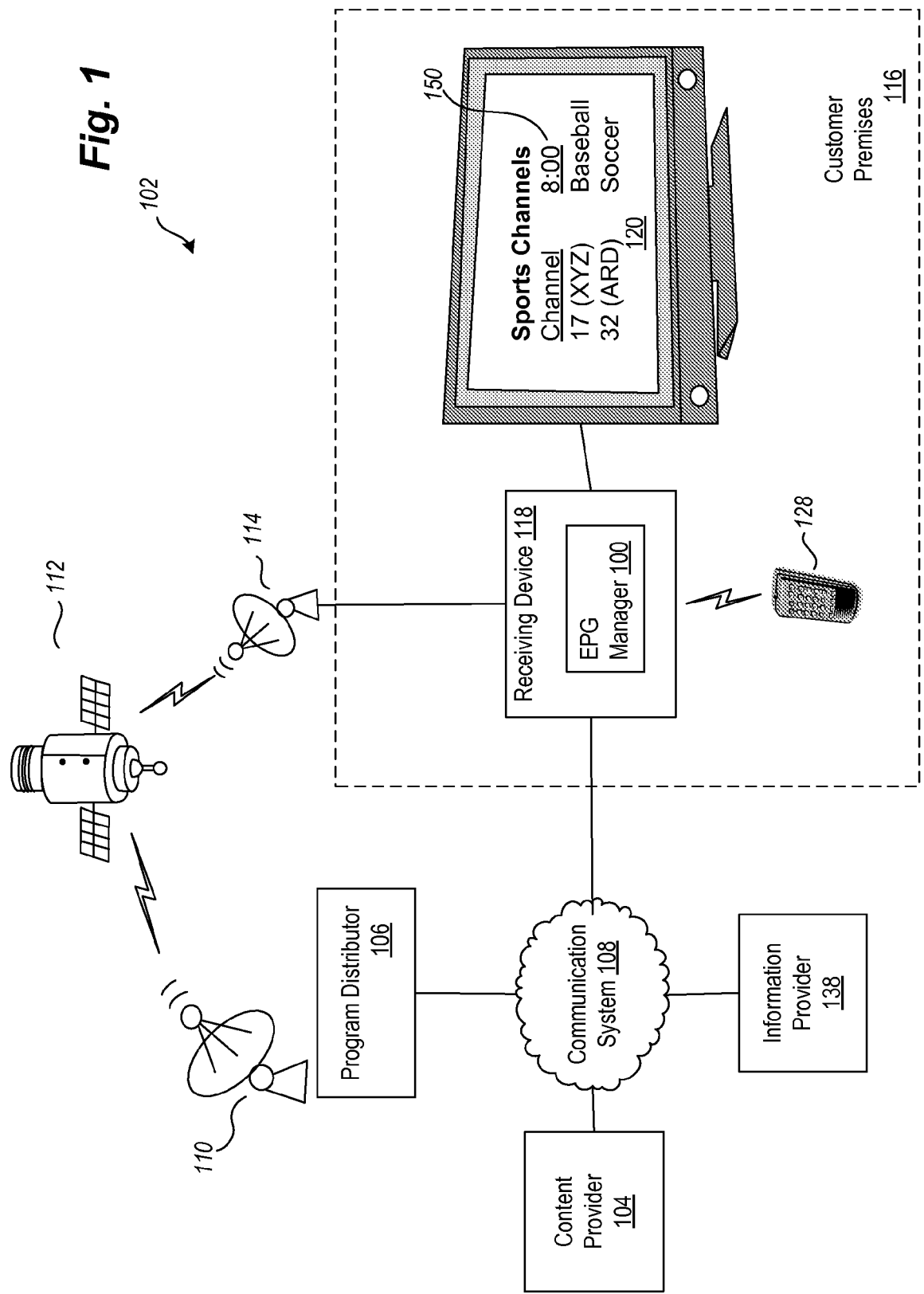

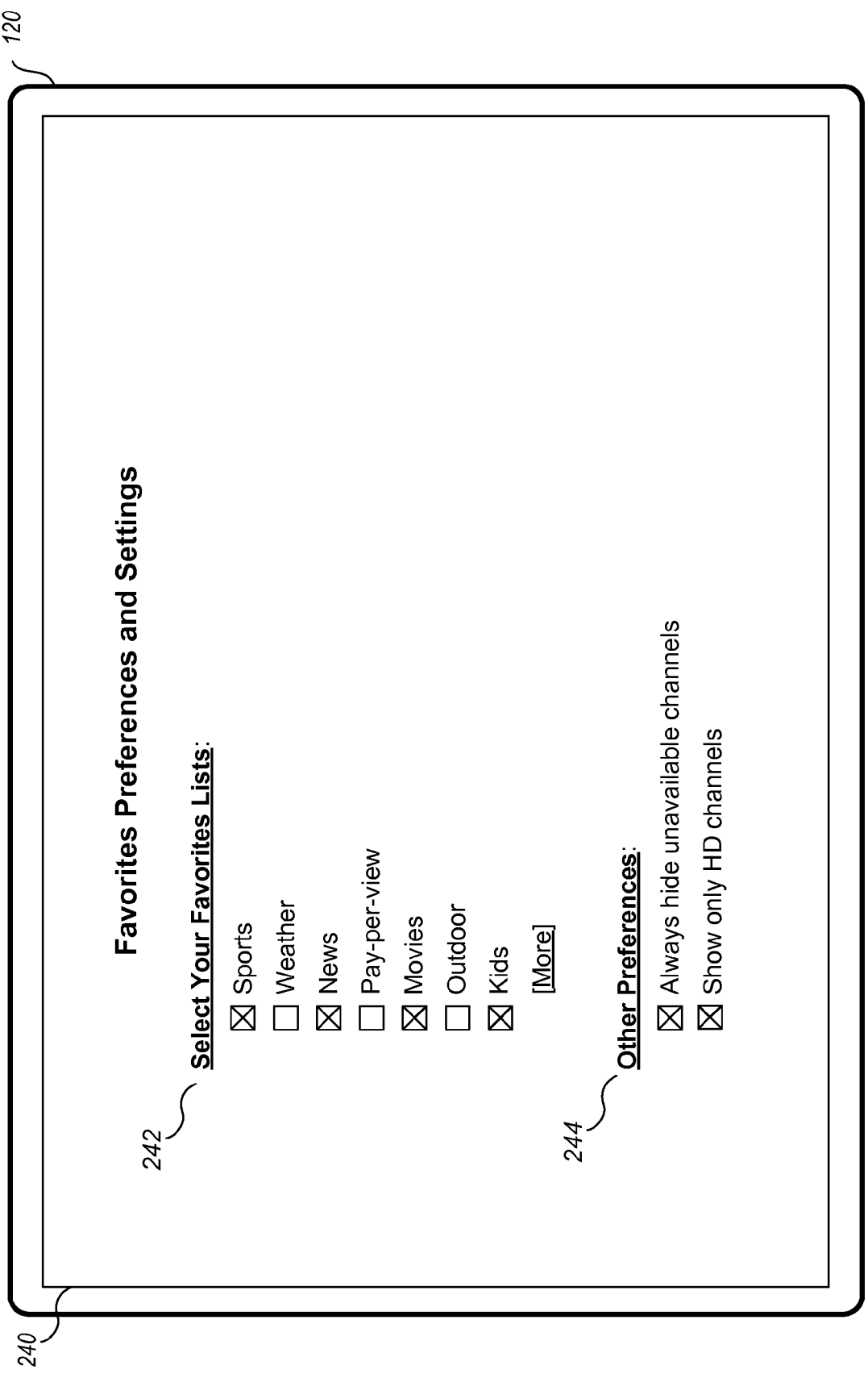

SYSTEMS AND METHODS FOR PROVIDING PREDEFINED CATEGORY-BASED CHANNEL LISTS

TECHNICAL FIELD

The technical field relates to providing category-based channel lists and more particularly, to apparatus, systems, and methods for distributing, for presentation in an electronic program guide, lists of channels that carry related programming.

BRIEF SUMMARY

In one embodiment, a set-top box provides predefined channel lists. The set-top box includes an electronic program guide manager that is configured to receive from a program distributor a channel list having an associated category of programming, the channel list including indicators of multiple channels that each carry at least some programming that is in the associated category; receive from a user a request to present the channel list; and present in an electronic program guide at least some of multiple channels of the channel list.

In another embodiment, a method in a receiving device for providing predefined channel lists is provided. The method comprises receiving from a program distributor a channel list having an associated category of programming, the channel list including indicators of multiple channels that each carry at least some programming that is in the associated category; receiving from a user a request to present the channel list; and presenting at least some of multiple channels of the channel list.

In a further embodiment, a method in a program distributor for providing a predefined channel list is provided. The method comprises generating multiple channel lists, each channel list having an associated category of programming and including indicators of multiple channels that each carry at least some programming that is in the associated category; and causing a remote receiving device to present at least some of multiple channels of one of the multiple channel list, by transmitting to the receiving device the multiple channel lists.

BRIEF DESCRIPTION OF THE DRAWINGS

The components in the drawings are not necessarily to scale relative to each other. Like reference numerals designate corresponding parts throughout the several views.

FIG. 1 is a block diagram illustrating an example content distribution environment in which embodiments of an electronic program guide manager may be implemented.

FIGS. 2A-2E are block diagrams illustrating example user interfaces provided by example embodiments.

DETAILED DESCRIPTION

A. Environment Overview

Figure 2A:
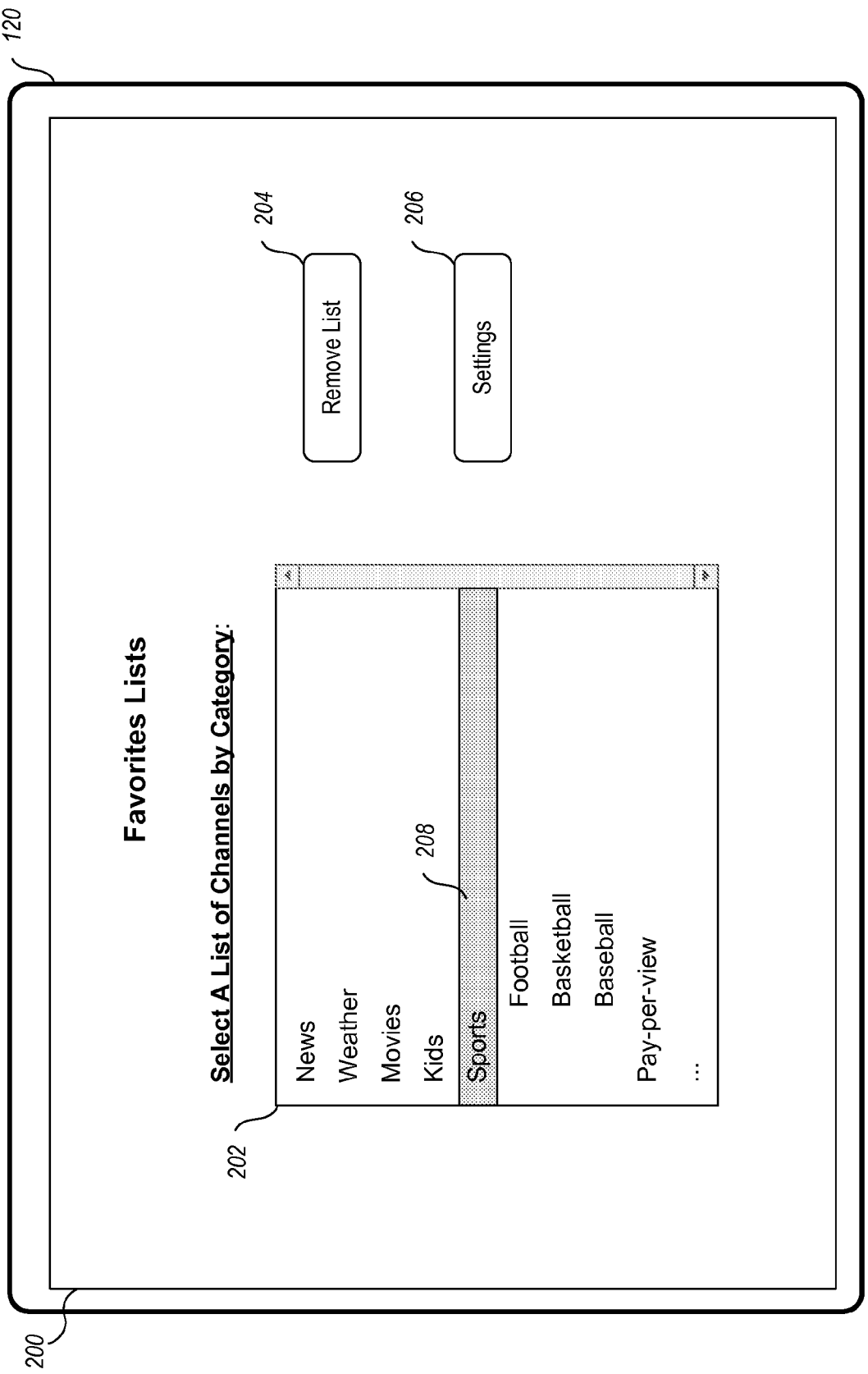

FIG. 1 is an overview block diagram illustrating an example content distribution environment 102 in which embodiments of an Electronic Program Guide ("EPG") manager 100 may be implemented. In this example, the EPG manager 100 operates upon a receiving device 118 and is configured to receive a predefined category-based channel list (or a "predefined favorites list"). The channel list has an associated category of programming, such as sports, news, comedy, or the like. The channel list includes indicators of multiple channels that each carry at least some programming that is in the associated category. In response to a user request to view the channel list, the EPG manager 100 presents, via presentation device 120, an electronic program guide 150 that includes at least some of the multiple channels of the channel list.

Before providing additional details regarding the operation and constitution of the EPG manager 100, the content distribution environment 102 of the EPG manager 100 will briefly be described. In the content distribution environment 102, audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content or audio content, to a distributor, such as the program distributor 106. Example content providers include television stations which provide local or national television programming, special content providers which provide premium based programming or pay-per-view programming, or radio stations which provide audio programming.

Program content, interchangeably referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is communicated (i.e., "uplinked") by antenna 110 to satellite 112 (separately illustrated herein from, although considered part of, the communication system 108). The communicated uplink signal may contain a plurality of multiplexed (e.g., time division multiplexed) programs that are organized into distinct logical or physical channels. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. Some types of receiver antenna 114 are operable to receive signals from a single satellite 112. Other types of receiver antenna 114 are operable to receive signals from multiple satellites 112 and/or from terrestrial based transmitters. In some embodiments, antenna 114 is a terrestrial "over-the-air" ("OTA") broadcast antenna that is configured to receive a program signal from a terrestrial based transmitter, such as broadcast transmit tower. Furthermore, in some cases, the receiving device 118 is operable to receive signals from multiple, distinct antennas.

The receiver antenna 114 can be located at customer premises 116. Examples of customer premises 116 include a residence, a business, or any other suitable location operable to receive signals from satellite 112. The received signal is communicated, typically over a hard-wire connection, to a receiving device 118. The receiving device 118 converts the received signal from antenna 114 into a signal and/or format suitable for communication to a presentation device 120 or another device, such as a digital video recorder or a home computing system. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The receiving device 118 may receive programming partially from, or entirely from, another source other than the above-described receiver antenna 114. Other embodiments of the receiving device 118 may receive data from program distributors 106 and/or content providers 104 via locally broadcast RF signals, cable, fiber optic, Internet media, or the like.

In addition, information provider 138 may provide various forms of content and/or services to various devices residing in the customer premises 116. For example, information provider 138 may provide a Web page (or other information) to the receiving device 118 or other computing device. Information provider 138 may further perform or facilitate electronic commerce transactions.

With an ever-increasing number of channels and an ever-widening variety of programming, it becomes increasingly difficult for a user to efficiently access desired programming. In one embodiment, a predefined category-based channel list is employed to organize channels by programming category or type. The program distributor 106 (or some other entity, such as the information provider 138) can create multiple channel lists that each organize multiple channels that carry a particular category of programming. The channel lists may then be transmitted to the receiving device 118, where they can be used to provide to a user an efficient, category-based navigation scheme within an electronic program guide, or other user interface element. In this manner, the channel list can operate as a kind of "predefined favorites list," in that user need not manually assemble a list of favorite or commonly accessed channels.

In the illustrated example, the EPG manager 100 operates upon the receiving device 118. The EPG manager 100 is configured to receive one or more channel lists from the program distributor 106 or some other entity, such as the information provider 138. Each channel list is associated with a particular category of programming and includes indicators (e.g., channel numbers or network names) of multiple channels that each carry at least some programming in the associated category. The channel lists are transmitted to the receiving device 118 from time to time and stored thereon by the EPG manager 100. A user, interacting with the receiving device 118 and/or the presentation device (e.g., via remote 128), can then request to view a specified channel list. In response, the EPG manager 100 generates and initiates presentation of the electronic program guide 150 for display upon the presentation device 120. The electronic program guide 150 is a tabular display of at least some of the channels of the specified channel list. In addition, the electronic program guide 150 is interactive, in that the user can, by generating inputs with the remote 128, select a displayed channel for viewing, browse to other channels, browse to times in the future or past, and the like. By using a channel list, a user desiring to access a particular type of programming, such as drama or sports, can easily request to view all channels that carry programming of that type.

Channel lists can be generated for various programming categories. Example programming categories include sports, movies, women's, men's, children's, drama, pay-per-view, video on demand, outdoor, shopping, entertainment, news, weather, international, and the like. In some embodiments, category hierarchies may be established. For example, a sports category may have subcategories of football, baseball, basketball, golf, soccer, and the like. Likewise, a movies category may have subcategories of drama, comedy, action, horror, and the like. In addition, an international category may have subcategories of Spanish, French, Chinese, and Japanese programming.

In some embodiments, related programming channel lists may also be generated. A related programming channel list would include, for a particular channel, other channels that are currently carrying programming that is related to (e.g., the same category as) programming that is currently airing on the particular channel. For example, if a user is viewing a sporting event on one channel, the user could access a related programming channel list to see which other channels are currently also carrying sports programming. Related programming channel lists are typically generated/updated so as to coincide with programming schedules, such that a user can obtain timely information about programming related to a currently viewed program.

A channel included in a particular channel list need not carry programming that is exclusively in the category associated with the list. For example, if a channel typically carries programming in the drama, crime, and comedy categories, that channel may be included in the drama, crime, and comedy channel lists. Various approaches to determining whether to include a channel in a particular list are contemplated. In one embodiment, a channel that carries more than a predetermined threshold amount (e.g., 25% of the time) of programming in one category will be included in the channel list for that category. In another embodiment, a channel will be placed into up to a predetermined number (e.g., three) of channel lists, based on a ranking of programming categories (e.g., the top three) carried by that channel.

In some embodiments, the inclusion of a channel into a particular channel list may be performed in exchange for compensation. For example, content provider 104 pays the program distributor 106 to include a channel produced by, or associated with, the content provider 104 in a particular channel list. Inclusion of the channel in the channel list may attract additional viewers to the channel due to the convenience of accessing the channel provided by the channel list. In addition, in some embodiments, the content provider 104 pays the program distributor 106 to have the channel displayed in a particular manner, such as at or near the top of the electronic program guide 150 presented by the EPG manager 100.

A channel list may be transmitted to the EPG manager 100 in various ways. In some embodiments, the channel list is transmitted as metadata along with program content. For example, the channel list may be transmitted along with program content over a satellite network, cable network, Internet Protocol network, or the like. In other embodiments, the channel list is transmitted using a communication mechanism that is distinct from that used to transmit program content. For example, the program content may be transmitted via a satellite or terrestrial broadcast network, while the channel list is transmitted via a land-based Internet Protocol network.

The channel list is typically re-transmitted by the program distributor 106 to the EPG manager 100 from time to time. In one embodiment, the channel list is re-transmitted on a periodic basis, such as every ten minutes, every hour, or the like. In another embodiment, the channel list is re-transmitted whenever the program distributor 106 updates information therein. For example, if a new sports channel is added to programming distributed by the program distributor 106, an updated channel list including the new channel is transmitted to the EPG manager 100. In some embodiments, rather than transmitting an entire updated channel list, only differential information, such as added or removed channels, is transmitted.

The above description of the content distribution environment 102 and the customer premises 116, and the various devices therein, is intended as a broad, non-limiting overview of an example environment in which various embodiments of an EPG manager may be implemented. FIG. 1 illustrates just one example of a content distribution environment 102 and that the various embodiments discussed herein are not limited to such environments. In particular, content distribution environment 102 and the various devices therein, may contain other devices, systems and/or media not specifically described herein.

Different architectures are contemplated. For example, rather than receiving program content via a satellite broadcast network as shown in FIG. 1, the receiving device 100 may receive programming via an Internet Protocol ("IP") network. In addition, the EPG manager 100 need not necessarily operate upon the receiving device 118. In some embodiments, the EPG manager 100 executes as a hosted, network-accessible application, as may be provided by a Web server and/or other infrastructure that is part of the information provider 138 or another system. In such an embodiment, the receiving device 118 may include a Web browser or other program used to interact with an electronic program guide provided by the remotely executing EPG manager 100.

Example embodiments described herein provide applications, tools, data structures and other support to implement an EPG manager that receives and presents lists of channels carrying related program content. Other embodiments of the described techniques may be used for other purposes, including content management or description generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Aspects of an Example EPG Manager

FIGS. 2A-2E are block diagrams illustrating example user interfaces provided by example embodiments. In particular, FIG. 2A shows a user interface screen 200 displayed by the EPG manager 100 upon a presentation device 120. The screen 200 includes menu 202 and user-selectable controls 204 and 206. The menu 202 includes indications of multiple available channel lists. In this example, the menu 202 includes channel lists in the news, weather, movies, children's, sports, and pay-per-view categories. The sports category is a super-category that includes three subcategories: football, basketball, and baseball.

The menu 202 includes a selection indicator 208 that indicates the currently selected channel list. In this example, the indicator 208 is indicating that the sports channel list is the currently selected channel list. The user can select other channel lists by moving the indicator 208, such as by using directional buttons (e.g., arrows) on a remote 128. The user can access the currently selected channel list by activating a suitable button (e.g., a "select" or "enter" button) on the remote 128. Upon receiving the user input, the EPG manager displays an electronic program guide that includes the channels of the selected channel list, as described further with respect to FIGS. 2B-2D, below.

The user-selectable controls 204 and 206 are buttons that allow the user to customize or otherwise specify behavior and/or operation of the EPG manager 100 and its channel lists. Upon selection of control 204, the selected channel list is removed from the menu 202. In this manner, the user can hide or channel lists that are directed to categories of programming that are of no (or little) interest to the user. Removing a channel list from the menu 202 includes inhibiting future display of the removed channel list from the menu 202. Upon selection of control 206, the EPG manager 100 will display a user interface screen with controls for specifying channel list behaviors, as described further with respect to FIG. 2E, below.

Other user interface controls/functions are contemplated, such as the capability to reorder elements of the menu 202, such that more frequently accessed channel lists are placed nearer the top of the menu 202. In some embodiments, this reordering is performed automatically by the EPG manager 100, based on usage information that tracks how frequently particular channel lists are accessed.

Figure 2B:
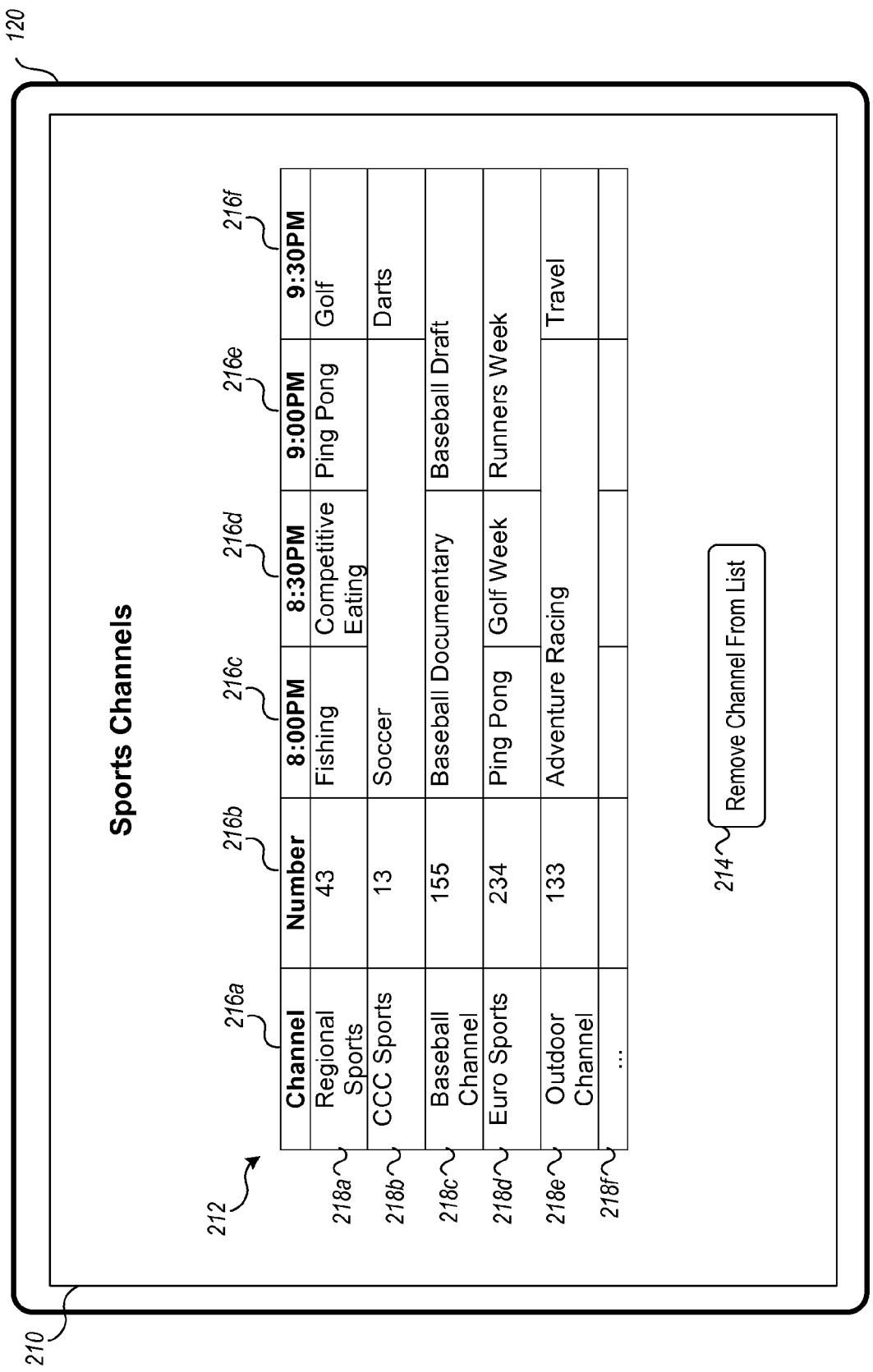

FIG. 2B shows a user interface screen 210 displayed upon the presentation device 120. The screen 210 includes an electronic program guide 212 for the sports channel list, as selected by the user in the context of FIG. 2A. The electronic program guide 212 includes rows 218a-218f that each display information about programming carried by a particular channel of the channel list. The information of rows 218a-218f is organized into fields 216a-216f, which respectively display a channel name (e.g., network name), channel number, a first timeslot, a second timeslot, a third timeslot, and a fourth timeslot. Each of the timeslots 216c-216f display programming available during a particular 30-minute time period. For example, row 218b indicates that a channel named "CCC Sports," at channel number 13, is playing a soccer event from 8:00-9:30 PM, followed by a darts event starting at 9:30 PM. In other embodiments, more or less information may be displayed and information may be displayed in a different manner. For example, additional timeslots and/or channels may be displayed, such as on presentation devices having dimensions that are suitable for displaying the additional information.

Note that not all channels displayed by the electronic program guide 212 exclusively carry sports programming. For example, the Outdoor Channel, displayed in row 218e, carries a travel program (entitled "Travel") in the 9:30 PM time slot, which is unlikely to be considered sports programming by most users. However, that channel does carry at least some sports programming, as indicated by an adventure racing program (entitled "Adventure Racing") in the 8:00 PM time slot. As discussed above, the channel list may be ordered, during generation or in a dynamic manner by the EPG manager 100, based on the amount of programming in the associated category that is carried by each channel, such that channels having more (e.g., a higher percentage) programming in the category appear before those having less programming in the category. In addition, in some embodiments, the EPG manager 100 indicates programming that is in the associated category, such as by highlighting programs that are in the category, graying (shading) out programs that are not in the category, or the like. For example, in row 218e, the "Travel" program in the 9:30 PM time slot could be grayed out and/or the "Adventure Racing" program in the 8:00 PM time slot could be highlighted, such as by use of a particular color.

The screen 210 also includes user selectable control 214, which is a button that can be activated by a user to remove a channel from the channel list. In particular, the user can select a channel (e.g., using arrow keys of a remote-control device) and then activate control 214 to remove the selected channel from view in the electronic program guide 212. In this manner, the user can customize the channel list viewed by electronic program guide 212, such that channels that are of no or lesser interest to the user can be hidden from view.

Other user interface controls/functions are contemplated, such as the capability to manually reorder channels in the electronic program guide 212, such that more frequently accessed channels are placed nearer the top of the guide 212. In some embodiments, this reordering is performed automatically by the EPG manager 100, based on usage information that tracks how frequently particular channels are accessed. In addition, the user may be able to restore the electronic program guide 212 to a default configuration, such as by activating a button or other user interface control of the electronic program guide 212. In the default configuration, any channels hidden or removed by the user, and any channel list reordering, would be restored to a standard view.

Figure 2C:
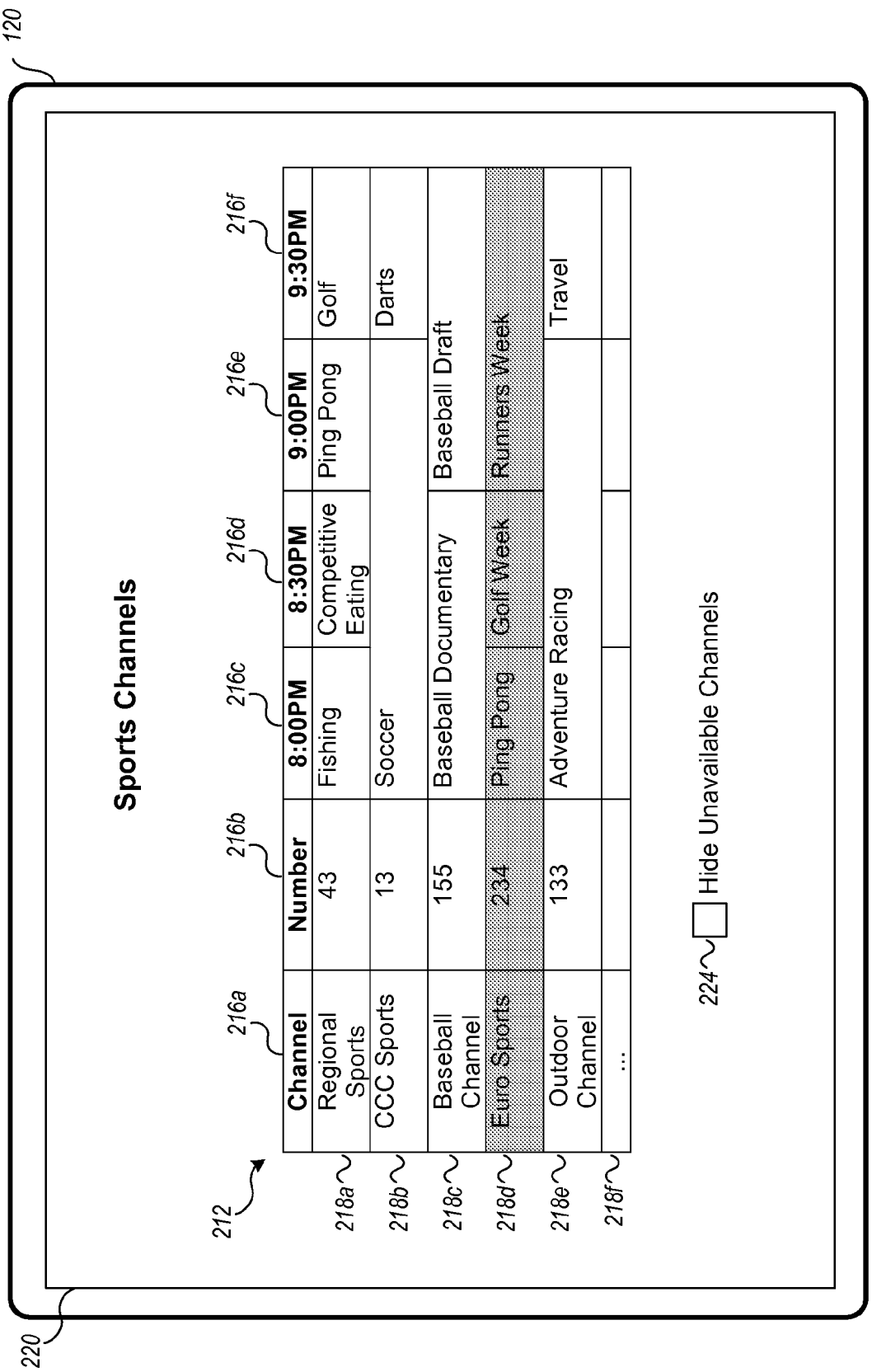

FIG. 2C shows a user interface screen 220 displayed by the EPG manager 100 upon the presentation device 120. The screen 220 includes the electronic program guide 212 described with respect to FIG. 2B. In this example, the electronic program guide 212 has grayed out row 218d to indicate that channel 234 ("Euro Sports") displayed in that row is unavailable for viewing. A channel may be unavailable for viewing for various reasons, such as because the channel is not included in the subscription package associated with the receiving device 118 and/or the user, because the channel carries content that not accessible due to a parental control (e.g., mature or adult content), or the like. A channel may also be unavailable due to a communication outage, such as poor antenna signal reception caused by inclement weather or obstructions, a network outage, a power outage, or the like. In other embodiments, the EPG manager 100 may indicate other types of channels. For example, rows of the electronic program guide 221 that include pay-per-view channels may be colored differently than other (non-pay-per-view) channels, or may be associated with an icon (e.g., a dollar sign).

The screen 220 also includes a user-selectable control 224, which is a checkbox that can be selected by a user to direct the EPG manager 100 to hide unavailable channels. In particular, when the user selects (checks) control 224, such as by pressing a suitable button on a remote-control device, the EPG manager 100 will hide (e.g., inhibit display of) all unavailable channels, such as the channel of row 218d, from view, as described with respect to FIG. 2D, below.

Figure 2D:
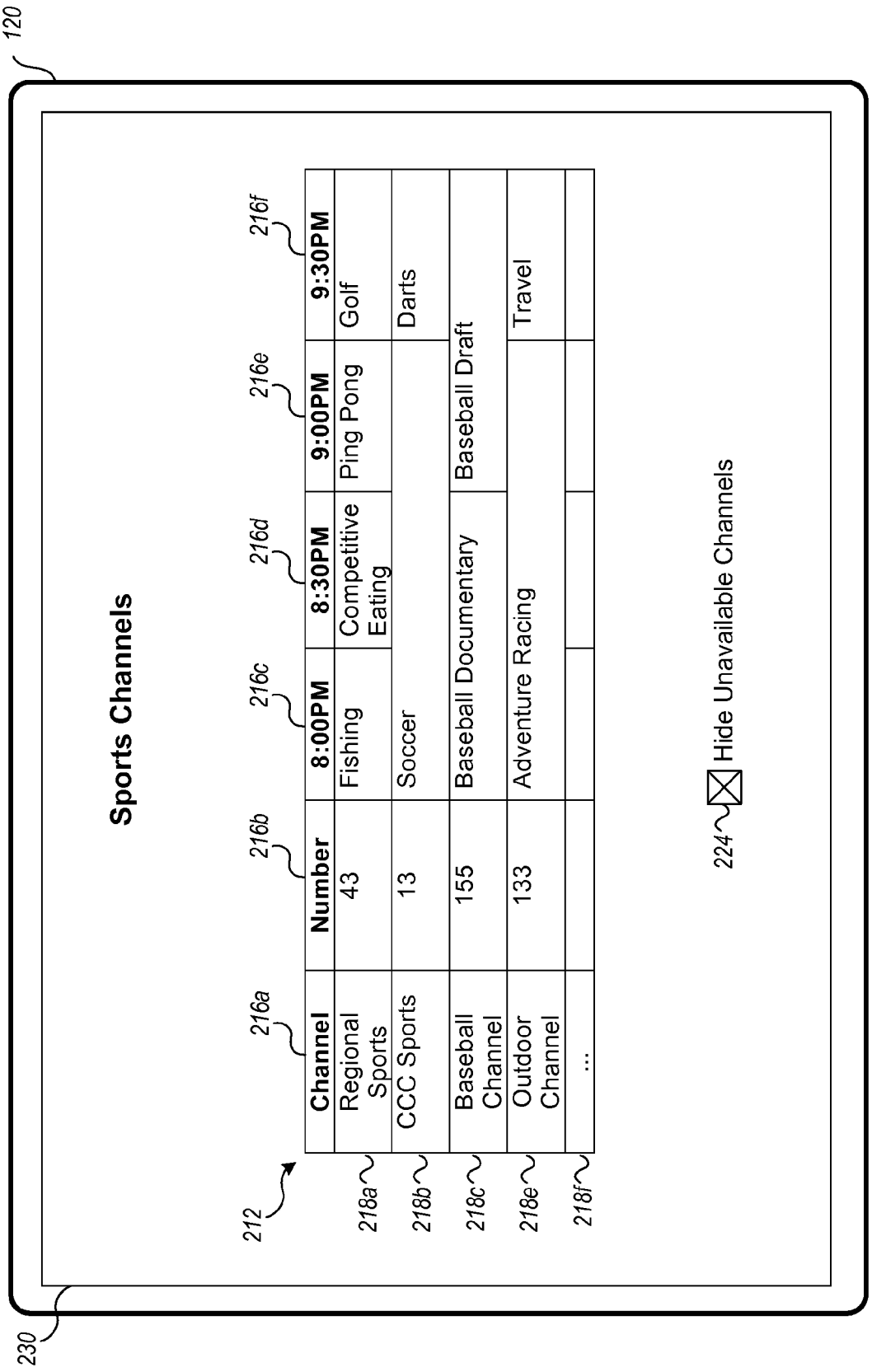

FIG. 2D shows a user interface screen 230 displayed by the EPG manager 100 upon the presentation device 120. The screen 230 includes the electronic program guide 212 described with respect to FIG. 2C. In this example, the user has selected (checked) control 224, causing the EPG manager 100 to filter out all unavailable channels and inhibit their display. In particular, note that the channel named "Euro Sports" of row 218d (seen in FIG. 2C) is no longer visible. Other similar filtering controls are contemplated, such as a control that hides pay-per-view channel, a control that hides channels that have less than some specified amount of programming in the channel list's category, and the like.

FIG. 2E shows a user interface screen 240 displayed by the EPG manager 100 upon the presentation device 120. The screen 240 includes user-selectable controls 242 and 244. The controls 242 include multiple checkboxes that can be selected by a user to specify which channel lists are to be included in the channel list menu 202 or similar user interface component. The controls 244 include multiple checkboxes that can be selected by a user to specify display preferences, such as to always hide unavailable channels, only display high definition ("HD") channels, and the like.

C. Example Computing System Implementation

Figure 3:
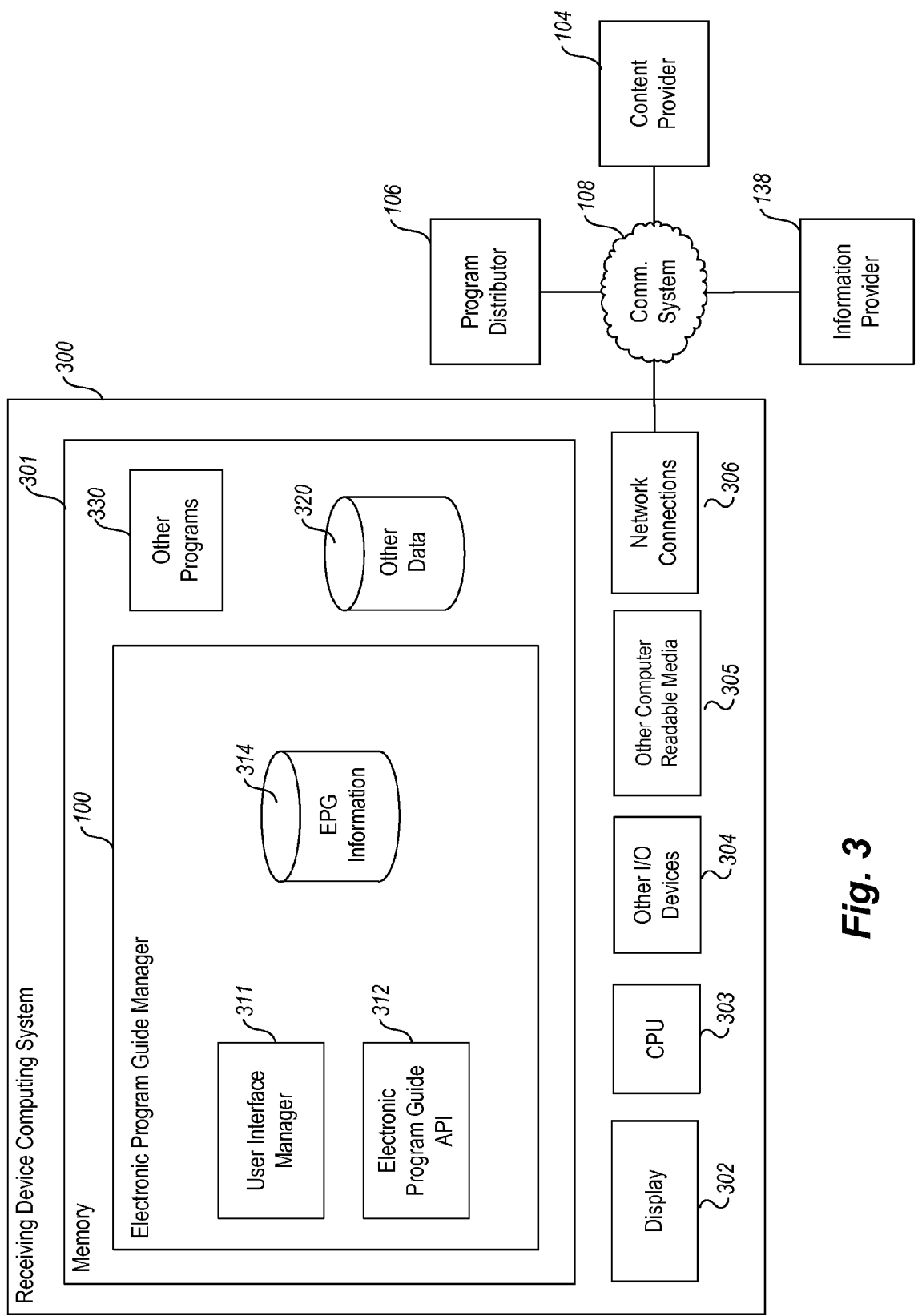
FIG. 3 is a block diagram of a computing system for practicing example embodiments of an electronic program guide manager.

FIG. 3 is a block diagram of a computing system for practicing example embodiments of an EPG manager. FIG. 3 shows a receiving device computing system 300 that may be utilized to implement an EPG manager 100. In one embodiment, the receiving device computing system 300 is part of a set-top box configured to receive and display programming on a presentation device. In other embodiments, the receiving device computing system 300 is part of a presentation device, such as a television.

Note that one or more general purpose or special purpose computing systems/devices may be used to implement the EPG manager 100. In addition, the computing system 300 may comprise one or more distinct computing systems/devices and may span distributed locations. Furthermore, each block shown may represent one or more such blocks as appropriate to a specific embodiment or may be combined with other blocks. Also, the EPG manager 100 may be implemented in software, hardware, firmware, or in some combination to achieve the capabilities described herein.

In the embodiment shown, receiving device computing system 300 comprises a computer memory ("memory") 301, a display 302, one or more Central Processing Units ("CPU") 303, Input/Output devices 304 (e.g., keyboard, mouse, CRT or LCD display, and the like), other computer-readable media 305, and network connections 306. The EPG manager 100 is shown residing in memory 301. In other embodiments, some portion of the contents, some of, or all of the components of the EPG manager 100 may be stored on and/or transmitted over the other computer-readable media 305. The components of the EPG manager 100 preferably execute on one or more CPUs 303 and facilitate the re-recording of disrupted programming, as described herein. Other code or programs 330 (e.g., an audio/video processing module, a program guide manager module, a Web server, and the like) and potentially other data repositories, such as data repository 320, also reside in the memory 301, and preferably execute on one or more CPUs 303. Of note, one or more of the components in FIG. 3 may not be present in any specific implementation. For example, some embodiments may not provide other computer readable media 305 or a display 302.

In a typical embodiment, the EPG manager 100 includes a user interface manager 311, an electronic program guide application program interface ("EGP API") 312, and a data repository 315 that includes EPG information. The EPG manager 100 interacts via the communication system 108 with program distributor 106, content provider 104, and/or information provider 138, as discussed with respect to FIG. 1.

The user interface manager 311 provides a view and a controller that facilitate user interaction with the EPG manager 100 and its various components. For example, the user interface manager 311 provides interactive graphical user interface screens such as those described with respect to FIGS. 2A-2E. As discussed, such user interfaces allow the user to select one of multiple channel lists, to view a channel list within an electronic program guide, to configure the operation of the EPG manager 100, and the like. The user interface manager 311 also receives input from a user (e.g., in the form of user interface events generated by a remote-control device or other input device) and translates those inputs into the appropriate command for initiation by the EPG manager 100.

The EPG API 312 provides programmatic access to one or more functions of the EPG manager 100. For example, the API 312 may provide a programmatic interface to functions of the EPG manager 100 that may be invoked by one of the other programs 330 or some other module. In this manner, the API 312 may facilitate the development of third-party software, such as user interfaces, plug-ins, adapters (e.g., for integrating functions of the EPG manager 100 into desktop applications), and the like.

In addition, the API 312 may be in at least some embodiments invoked or otherwise accessed via remote entities, such as program distributor 106, the content provider 104, or the information provider 138. For example, the information provider 138 may transmit ("push") channel list information to the EPG manager 100, by invoking one or more functions of the API 312. As another example, EPG manager 100 may make it stored channel list information available to other systems (e.g., a home computing system) via the API 312.

The data repository 315 stores EPG information, such as one or more channel lists. The channel lists may be represented in various ways, such as via one or more database records or text files. In addition, channel lists may include version information, such that the EPG manager 100 can determine when a channel list is out of date with respect to updated channel list information received from the program distributor 106 or other source. EPG information may also include configuration information used by the EPG manager 100, such as indications of display settings, filtering settings, and the like.

In some embodiments, the EPG manager 100 interacts with the program distributor 106, the content provider 104, and/or the information provider 138 for various purposes. As noted, the EPG manager 100 typically obtains channel lists from the program distributor 106, either as metadata transmitted along with (e.g., over the same communication mechanism) program data, or via a distinct communication mechanism. In other embodiments, the computing system 300 receives program data from one source, such as the program distributor 106, while the EPG manager 100 receives channel lists (and possibly other information) from another source, such as the content provider 104 and/or the information provider 138.

In an example embodiment, components/modules of the EPG manager 100 are implemented using standard programming techniques. For example, the EPG manager 100 may be implemented as a "native" executable running on the CPU 303, along with one or more static or dynamic libraries. In other embodiments, the EPG manager 100 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an EPG manager implementation. Also, other functions could be implemented and/or performed by each component/module, and in different orders, and by different components/modules, yet still achieve the functions of the EPG manager.

In addition, programming interfaces to the data stored as part of the EPG manager 100, such as in the data repository 315, can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 315 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an EPG manager.

Furthermore, in some embodiments, some or all of the components of the EPG manager 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The illustrated program distributor 106, content provider 104, and information provider 138 may be implemented using techniques similar to those described above. That is, each of the program distributor 106, content provider 104, and information provider 138 may comprise one or more computing systems similar to computing system 300, and include functionality implemented by way of a suitable arrangement of hardware, firmware, and/or software components.

D. Processes

Figure 4:
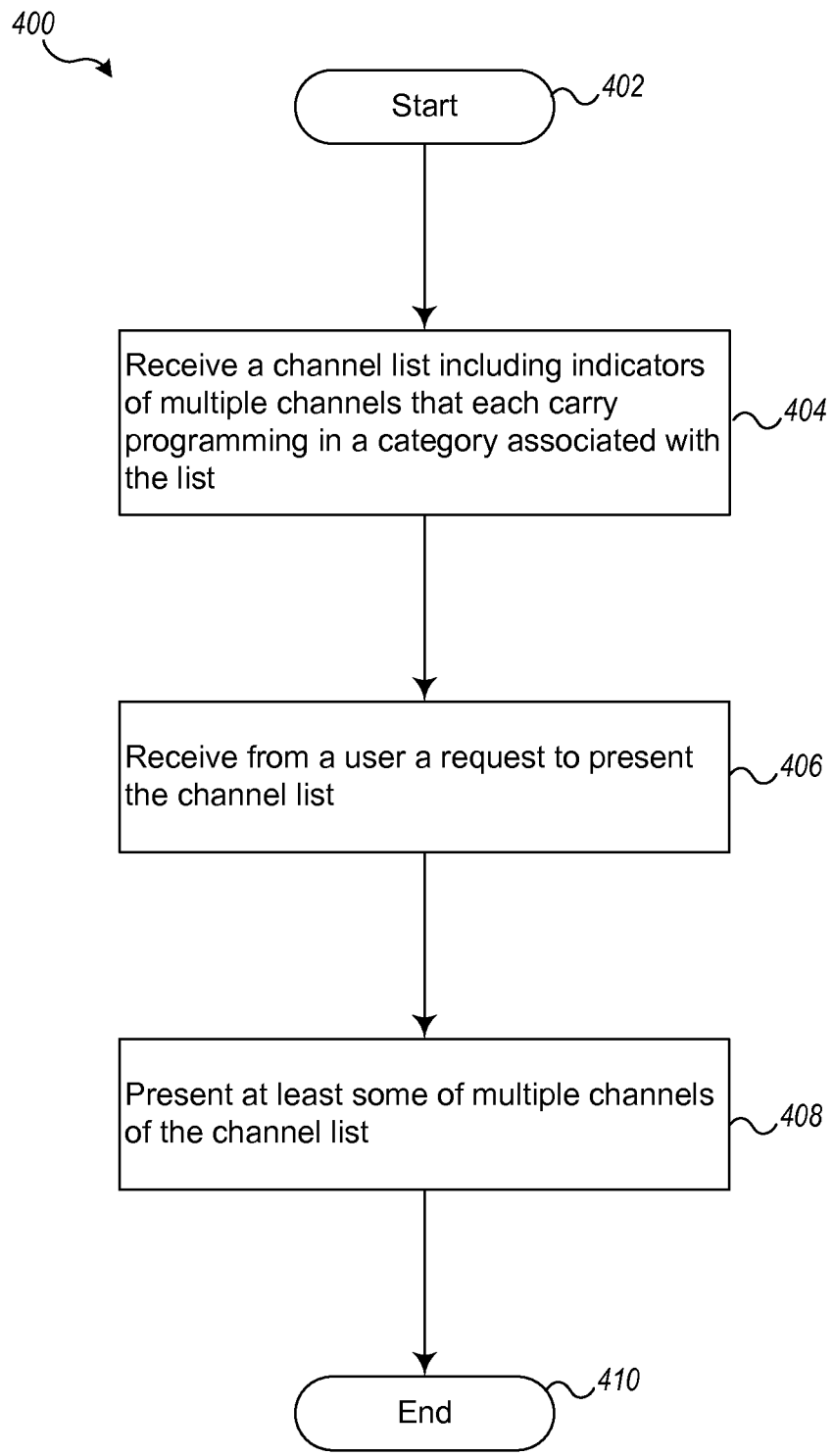
FIG. 4 is a flow diagram of an example electronic program guide manager process provided by an example embodiment.

FIG. 4 is a flow diagram of an example electronic program guide manager process provided by an example embodiment. In particular, FIG. 4 illustrates process 400 that may be implemented by, for example, one or more modules/components of the EPG manager 100 executing on the receiving device 118, as described with respect to FIGS. 1 and 3.

The illustrated process 400 starts at 402. At 404, the process receives a channel list including indicators of multiple channels that each carry programming in a category associated with the list. The channel list may be received as metadata transmitted along with program data received by the receiving device 118. In another embodiment, the EPG manager 100 obtains the channel list by accessing an information source distinct from the program distributor 106, such as by accessing a Web site or other information server situated on the Internet.

At 406, the process receives from a user a request to present the channel list. In one embodiment, the request is received from a remote-control device that is communicatively coupled to the receiving device. A user request may also be received as a network request, such as may be received from a user operating home computing system coupled to the receiving device 118.

At 408, the process presents at least some of multiple channels of the channel list. Typically the at least some of the multiple channels are presented as part of an electronic program guide, as described with respect to FIGS. 2B-2D, above. In other embodiments, the multiple channels may be presented as part of a Web page (e.g., as an HTML document) or other type of representation (e.g., as a Flash file). Presenting the at least some channels may include filtering out channels (e.g., channels that have been de-selected or removed by the user, channels that are not part of the user's subscription package, pay-per-view channels, or the like) and inhibiting display of the filtered channels.

At 410, the process ends. In other embodiments, the process may instead continue to one of steps 404-408 in order to receive additional channel lists and/or handle additional user inputs.

Some embodiments perform one or more operations/aspects in addition to the ones described with respect to process 400. For example, in one embodiment, process 400 presents a channel list menu, that provides access to multiple distinct channel lists each associated with a distinct category of programming.

Figure 5:
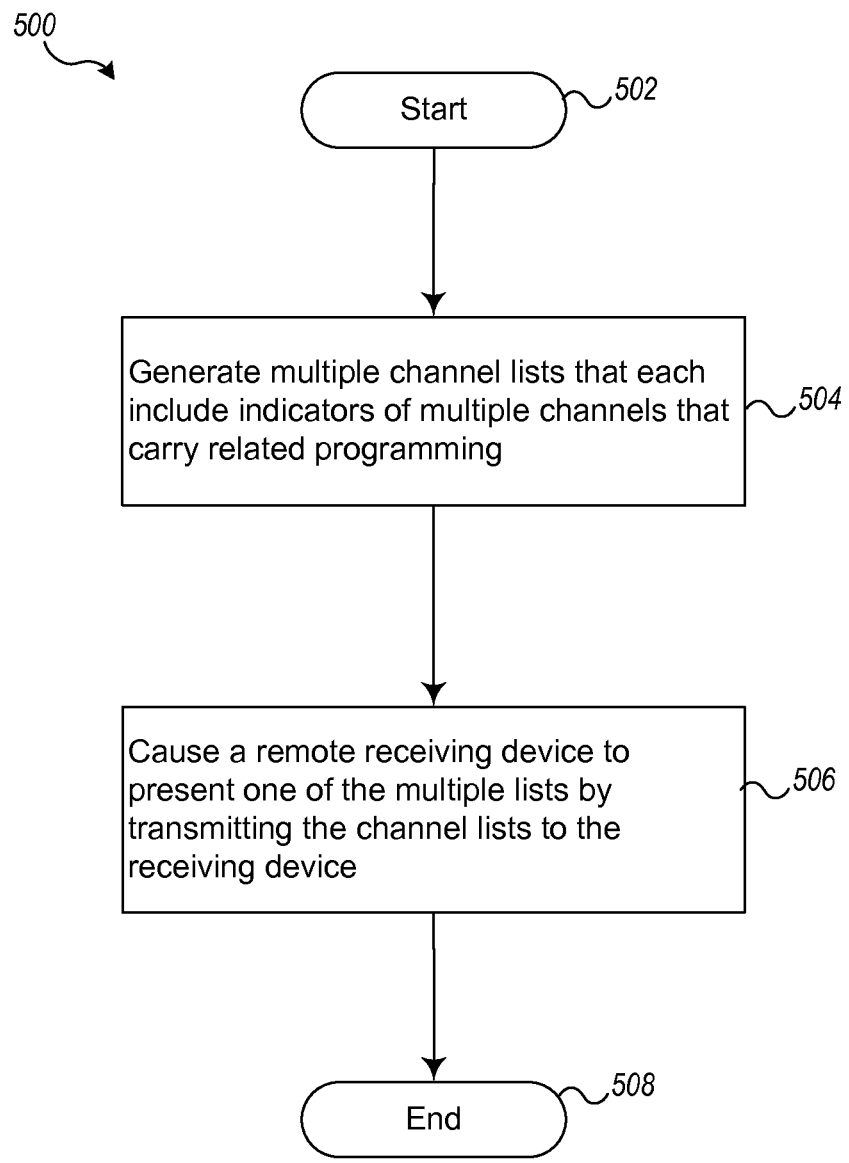
FIG. 5 is a flow diagram of an example channel list distributor process provided by an example embodiment.

FIG. 5 is a flow diagram of an example channel list distributor process provided by an example embodiment. In particular, FIG. 5 illustrates process 500 that may be implemented by, for example, one or more modules/components of the program distributor 106 and/or the information provider 138 executing on a computing system, as described with respect to FIGS. 1 and 3.

The illustrated process 500 starts at 502. At 504, the process generates multiple channel lists that each include indicators of multiple channels that carry related programming. Generating a channel list typically includes processing a channel information table (or other data structure) that describes the types/categories of programming carried by a channel, in order to locate channels that match a given category. As noted with respect to FIG. 1, in some cases a channel will be included in a channel list only if the channel carries more than some threshold amount of programming of a given category.

At 506, the process causes a remote receiving device to present one of the multiple lists by transmitting the multiple channel lists to the remote receiving device. As noted above, the multiple lists may be transmitted along with program data, or via some distinct mechanism.

At 508, the process ends. In other embodiments, the process may instead continue to one of steps 504-506 in order to periodically generate or update channel lists and/or to operate in a request-response loop that provides channel lists to client systems in an on-demand manner.

Some embodiments perform one or more operations/aspects in addition to the ones described with respect to process 500. For example, in one embodiment, process 500 ranks or orders channels within a channel list, such that the higherranked channels are those that carry a higher percentage of programming in the category of the channel list.

While various embodiments have been described hereinabove, it is to be appreciated that various changes in form and detail may be made without departing from the spirit and scope of the invention(s) presently or hereafter claimed.

The invention claimed is:

1. A set-top box configured to provide predefined channel lists, the set-top box comprising:
   an electronic program guide manager that is configured, when executed, to:
     receive from a program distributor a channel list having an associated category of programming, the channel list including indicators of multiple channels that each carry at least some programming that is in the associated category;
     receive from a user a request to present the channel list;
     display, on a menu section of a first user interface screen, the associated category of the received channel list;
     enable selection of the displayed associated category on the menu section of the first user interface screen by the user;
     receive from the user one of a request to remove the channel list resulting from the selection of the displayed associated category by the user and a request to present at least some of multiple channels of the channel list, the request to remove being made by selecting a first control item on the first user interface screen;
     in response to the received request to remove, remove the associated category of the received channel list from the first user interface screen;
     in response to the received request to remove, inhibit future display of the channel list on the first user interface screen;
     in response to the received request to present, present in the electronic program guide on a second user interface screen the at least some of multiple channels of the channel list, wherein the presentation of at least some of the multiple channels includes:
       generation of an electronic program guide that includes at least some of the multiple channels; and
       initiation of display on a presentation device of the generated electronic program guide on the second user interface screen;
     receive from the user, a selection of one of the at least some of the multiple channels displayed in the electronic program guide on the second user interface screen;
     receive from the user, a request to remove the selected one of the at least some of the multiple channels displayed in the electronic program guide on the second user interface screen, the request to remove being made by selecting a first control item on the second user interface screen;
     upon receiving the request to remove, remove the selected one of the at least some of the multiple channels displayed in the electronic program guide on the second user interface; and
     upon receiving the request to remove, inhibiting future display of the selected one of the at least some of the multiple channels displayed in the electronic program guide on the second user interface.

2. The set-top box of claim 1 wherein the associated category is one of: sports, movies, children, women, men, outdoor, video-on-demand, local, pay-per-view, shopping, entertainment, news, international, and weather.

3. The set-top box of claim 1 wherein the electronic program guide manager is further configured to:
   receive from the program distributor multiple channel lists each having an associated category of programming;
   receive from a user an indication of one or more categories of programming;
   determine one or more of the multiple channel lists, each of the determined one or more channel lists having an associated category that is one of the indicated one or more categories;
   present in an electronic program guide indications of the determined one or more channel lists; and
   inhibit presentation of indications of any of the multiple channel lists that are not one of the determined one or more channel lists.

4. The set-top box of claim 1 wherein the electronic program guide manager is further configured to:
   filter one or more channels of the multiple channels, the filtered channels being channels that are not accessible via the set-top box; and
   inhibit display of the filtered channels when the electronic program guide is presented.

5. The set-top box of claim 1 wherein the electronic program guide manager is stored on a memory of the set-top box, wherein the electronic program guide manager is communicatively coupled to a satellite communication network, and wherein the electronic program guide manager is further configured to receive the channel list via the satellite communication network.

6. The set-top box in claim 1, wherein the electronic program guide manager is further configured to:
   enable a selection by the user of one of the displayed multiple channels in the electronic program guide presented on the second user interface screen;
   receive from the user a request to remove the one channel resulting from the selection of the user, the request being made by selecting a second control item presented on the second user interface screen;
   in response to the received request to remove the one channel, remove the channel from the electronic program guide presented on the second user interface screen; and
   in response to the received request to remove the one channel, inhibit future display of the one channel in the electronic program guide.

7. A method in a receiving device for providing predefined channel lists, the method comprising:
   receiving from a program distributor a channel list having an associated category of programming, the channel list including indicators of multiple channels that each carry at least some programming that is in the associated category;
   receiving from a user a request to present the channel list;
   displaying the associated category of the received channel list on a menu section of a first user interface screen;
   enabling selection of the displayed associated category on the menu section of the first user interface by the user;
   receiving from the user one of a request to remove the channel list resulting from the selection of the displayed associated category by the user and a request to present at least some of multiple channels of the channel list, the request to remove being made by selecting a user control item on the first user interface screen;
   in response to receiving the request to remove, removing the category of the received channel list from the first user interface screen;
   in response to receiving the request to remove, inhibiting future display of the channel list on the first user interface screen;

in response to receiving the request to present, presenting at least some of multiple channels of the channel list, wherein the presenting at least some of the multiple channels includes:
    generating an electronic program guide that includes at least some of the multiple channels; and
    initiating display on a presentation device of the generated electronic program guide on a second user interface screen;
receiving from the user, a selection of one of the at least some of the multiple channels displayed in the electronic program guide on the second user interface screen;
receiving from the user, a request to remove the selected one of the at least some of the multiple channels displayed in the electronic program guide on the second user interface screen, the request to remove being made by selecting a first control item on the second user interface screen;
upon receiving the request to remove, removing the selected one of the at least some of the multiple channels displayed in the electronic program guide on the second user interface; and
upon receiving the request to remove, inhibiting future display of the selected one of the at least some of the multiple channels displayed in the electronic program guide on the second user interface.

8. The method of claim 7 wherein the associated category is one of: sports, movies, children, women, men, outdoor, video-on-demand, local, pay-per-view, shopping, entertainment, news, international, and weather.

9. The method of claim 7, further comprising:
receiving from the program distributor multiple channel lists each having an associated category of programming;
determining one or more of the multiple channel lists, each of the determined one or more channel lists having an associated category of programming that is of interest to a user;
presenting in an electronic program guide indications of the determined one or more channel lists; and
hiding from view any of the multiple channel lists that are not one of the determined one or more channel lists.

10. The method of claim 7, further comprising:
filtering one or more channels of the multiple channels, the filtered channels being channels that are not part of a subscription package associated with the receiving device; and
inhibiting display of the filtered channels when the electronic program guide is presented.

11. The method of claim 7 wherein receiving the channel list includes receiving the channel list from one of: a terrestrial broadcast network, a satellite network, a cable network, and an Internet Protocol network.

12. The method of claim 7, further comprising:
inhibiting display of one or more channels of the multiple channels, the inhibited one or more channels being channels that are not of interest to a user.

13. The method of claim 12 wherein inhibiting display of the one or more channels includes receiving an indication of the one or more channels from the user.

\* \* \* \* \*